(12) United States Patent
Aoki et al.

(10) Patent No.: US 11,899,930 B2
(45) Date of Patent: Feb. 13, 2024

(54) STORAGE MANAGEMENT APPARATUS, STORAGE MANAGEMENT METHOD, AND PROGRAM

(71) Applicant: SONY INTERACTIVE ENTERTAINMENT INC., Tokyo (JP)

(72) Inventors: Keiichi Aoki, Tokyo (JP); Masaki Takahashi, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 105 days.

(21) Appl. No.: 17/628,911

(22) PCT Filed: Jul. 20, 2020

(86) PCT No.: PCT/JP2020/028132
§ 371 (c)(1),
(2) Date: Jan. 21, 2022

(87) PCT Pub. No.: WO2021/015175
PCT Pub. Date: Jan. 28, 2021

(65) Prior Publication Data
US 2022/0261154 A1    Aug. 18, 2022

(30) Foreign Application Priority Data

Jul. 25, 2019  (JP) ................................. 2019-137009

(51) Int. Cl.
*G06F 3/06*      (2006.01)
(52) U.S. Cl.
CPC .......... *G06F 3/0604* (2013.01); *G06F 3/0655* (2013.01); *G06F 3/0679* (2013.01)
(58) Field of Classification Search
None
See application file for complete search history.

(56) References Cited

U.S. PATENT DOCUMENTS

2010/0262765 A1   10/2010  Cheon et al.
2013/0019071 A1*   1/2013  Lewis ..................... G06F 3/067
                                                            711/E12.001

(Continued)

FOREIGN PATENT DOCUMENTS

JP   2012058770 A   3/2012
WO   2015008358 A1  1/2015

OTHER PUBLICATIONS

Notice of Reasons for Refusal dated Feb. 7, 2023, from Japanese Patent Application 2021-534032, 4 sheets.

(Continued)

*Primary Examiner* — Charles J Choi
(74) *Attorney, Agent, or Firm* — XSENSUS LLP

(57) ABSTRACT

An object of the present invention is to reduce deterioration in responsiveness to storage of content in a flash memory. A storage management apparatus according to the present invention includes a flash memory including a plurality of blocks each having a reserved area and a normal area, acquires a new dataset when a writable area included in a normal area of the plurality of blocks is larger than the new dataset and the new dataset is smaller in size than the writable area included in the normal area of the plurality of blocks in a case where unnecessary datasets included in the plurality of blocks are deleted, copies non-unnecessary datasets from the normal area of a specific block including the unnecessary datasets to the normal area of another block, deletes all datasets included in the normal area of the specific block, and stores the new dataset in the normal area of the specific block from which all the datasets are deleted.

20 Claims, 8 Drawing Sheets

| MINIMUM TRANSFER RATE Rt | RESERVE RATE | BLOCK SIZE | RESERVED AREA SIZE | COPY RATE Rc FOR GC |
|---|---|---|---|---|
| 25MiB/sec | 10% | 576 MiB | 57.6MiB | 250 MiB/sec |
| | | 1728 MiB | 172.8MiB | |
| | 20% | 576MiB | 115.2MiB | 125 MiB/sec |
| | | 1728 MiB | 345.6 MiB | |
| | 68.7% | 576MiB | 395.5MiB | 46MiB/sec |
| | | 1728 MiB | 1186.4MiB | |
| 100MiB/sec | 40% | 1728 MiB | 691.2MiB | 250MiB/sec |
| | 80% | 1728 MiB | 1382.4MiB | 125MiB/sec |
| 200MiB/sec | 80% | 1728 MiB | 1382.4MiB | 250MiB/sec |

(56) References Cited

U.S. PATENT DOCUMENTS

2014/0204672 A1   7/2014 Lee et al.
2017/0123972 A1*  5/2017 Gopinath .............. G06F 3/0616

OTHER PUBLICATIONS

International Search Report and Written Opinion dated Oct. 27, 2020, from PCT/JP2020/028132, 9 sheets.

* cited by examiner

FIG.10

| MINIMUM TRANSFER RATE Rt | RESERVE RATE | BLOCK SIZE | RESERVED AREA SIZE | COPY RATE Rc FOR GC |
|---|---|---|---|---|
| 25MiB/sec | 10% | 576 MiB | 57.6MiB | 250 MiB/sec |
| | | 1728 MiB | 172.8MiB | |
| | 20% | 576MiB | 115.2MiB | 125 MiB/sec |
| | | 1728 MiB | 345.6 MiB | |
| | 68.7% | 576MiB | 395.5MiB | 46MiB/sec |
| | | 1728 MiB | 1186.4MiB | |
| 100MiB/sec | 40% | 1728 MiB | 691.2MiB | 250MiB/sec |
| | 80% | 1728 MiB | 1382.4MiB | 125MiB/sec |
| 200MiB/sec | 80% | 1728 MiB | 1382.4MiB | 250MiB/sec |

STORAGE MANAGEMENT APPARATUS, STORAGE MANAGEMENT METHOD, AND PROGRAM

TECHNICAL FIELD

The present invention relates to a storage management apparatus, a storage management method, and a program.

BACKGROUND ART

A flash memory is used as a storage apparatus for a computer such as a video game console. For example, downloaded programs and content are stored in the flash memory.

SUMMARY

Technical Problem

The flash memory has a plurality of blocks having a predetermined size. Data is to be written in each block. Due to the characteristics of the flash memory, it is difficult to rewrite only part of data in a block. Therefore, when only part of data in a specific block is no longer required, garbage collection is performed to copy only necessary data to another block, and then the specific block is entirely erased (released).

However, the garbage collection transfers a large amount of data, and thus imposes a heavy processing load. In some cases, therefore, the garbage collection hinders other processes such as a data download process.

The present invention has been made in view of the above circumstances. An object of the present invention is to provide a technology that reduces deterioration in responsiveness to storage of content in a flash memory.

Solution to Problem

In order to solve the above problem, a storage management apparatus according to the present invention includes a flash memory, new dataset acquisition means, block release means, and dataset write means. The flash memory includes a plurality of blocks. The plurality of blocks each include a normal area and a reserved area. One or more datasets are stored in the normal area. The means acquires a new dataset when a writable area included in a normal area of the plurality of blocks is larger than the new dataset and the new dataset is smaller in size than the writable area included in the normal area of the plurality of blocks in a case where unnecessary datasets included in the plurality of blocks are deleted. When the new dataset is to be acquired, the block release means copies non-unnecessary datasets from the normal area of a specific block including the unnecessary datasets to the normal area of another block, and deletes all datasets included in the normal area of the specific block. The dataset write means stores the new dataset in the normal area of the specific block from which all the datasets are deleted.

Further, a storage management method according to the present invention includes the steps of acquiring a new dataset when a writable area included in a normal area in a plurality of blocks included in a flash memory and each provided with a reserved area and the normal area where one or more datasets are stored, is larger than the new dataset, and the new dataset is smaller in size than the writable area in the normal area in the plurality of blocks in a case where unnecessary datasets included in the plurality of blocks are deleted, when the new dataset is to be acquired, copying non-unnecessary datasets from the normal area of a specific block including the unnecessary datasets to the normal area of another block, and deleting all datasets included in the normal area of the specific block, and storing the new dataset in the normal area of the specific block from which all the datasets are deleted.

Moreover, a program according to the present invention causes a computer to function as new dataset acquisition means, block release means, and dataset write means. The new dataset acquisition means acquires a new dataset when a writable area included in a normal area in a plurality of blocks included in a flash memory and each provided with a reserved area and the normal area where one or more datasets are stored, is larger than the new dataset, and the new dataset is smaller in size than the writable area in the normal area in the plurality of blocks in a case where unnecessary datasets included in the plurality of blocks are deleted. When the new dataset is to be acquired, the block release means copies non-unnecessary datasets from the normal area of a specific block including the unnecessary datasets to the normal area of another block, and deletes all datasets included in the normal area of the specific block. The dataset write means stores the new dataset in the normal area of the specific block from which all the datasets are deleted.

According to the present invention, it is possible to reduce deterioration in responsiveness to storage of content in a flash memory.

In an aspect of the present invention, when the new dataset is larger in size than the normal area of the plurality of blocks, the dataset write means may add, to the normal area, a reserved area included in a specific block among the plurality of blocks, the specific block being provided with no dataset, and store at least a part of the new dataset in the normal area of the specific block.

In another aspect of the present invention, the storage management apparatus may further include area change means that, based on a user operation, changes a reserved area included in the plurality of blocks to a normal area.

In still another aspect of the present invention, the storage management apparatus may further include area change means that, based on changes in an amount of dataset stored in the plurality of blocks, changes a reserved area included in the plurality of blocks to a normal area.

BRIEF DESCRIPTION OF DRAWINGS

FIG. 10 is a diagram illustrating a relation between a minimum transfer rate and a copy rate required for garbage collection.

DESCRIPTION OF EMBODIMENT

Figure 1:
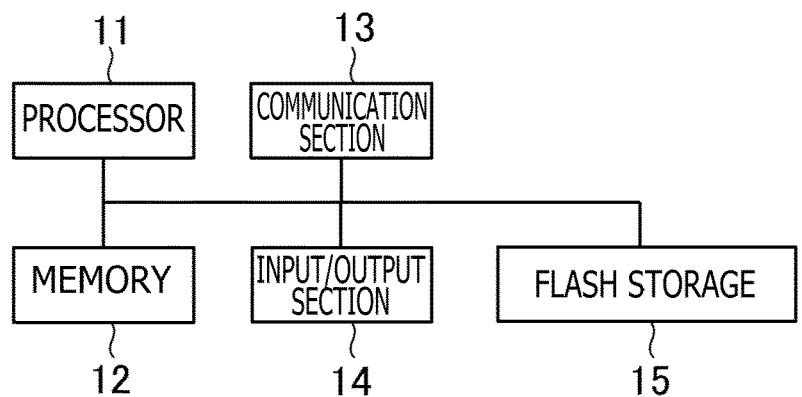
FIG. 1 is a diagram illustrating an example hardware configuration of an information processing apparatus according to an embodiment of the present invention.

An embodiment of the present invention is described below with reference to the accompanying drawings. Components having the same function are designated by the same reference numeral and will not be redundantly described.

An information processing apparatus for storing an archive as a dataset in a flash memory will be described in conjunction with the present embodiment. One archive has, for example, an application program while another archive has video and audio content used by the application program. The information processing apparatus may receive an archive through a network and store the received archive in a flash memory. Alternatively, the information processing apparatus may read an archive stored on an information storage medium such as a Blu-ray (registered trademark) optical disc, and store the read archive in a flash memory.

FIG. 1 is a diagram illustrating an example hardware configuration of the information processing apparatus according to the present embodiment of the present invention. The information processing apparatus is, for example, a video game console. The information processing apparatus includes a processor 11, a memory 12, a communication section 13, an input/output section 14, and a flash storage 15.

The processor 11 operates in accordance with programs stored in the memory 12, and controls, for example, the communication section 13, the input/output section 14, and the flash storage 15. It should be noted that the programs may be stored on a storage medium externally readable by a computer and supplied or may be supplied through a network such as the Internet.

The memory 12 includes a volatile memory element such as a dynamic random access memory (DRAM). The memory 12 stores a program to be executed among the abovementioned program. Further, the memory 12 stores information and computation results inputted, for example, from the processor 11 and the communication section 13. It should be noted that the information processing apparatus includes the memory 12 and an external storage apparatus including the flash storage 15, and stores the programs and the information on the external storage apparatus. It should be noted that the information processing apparatus additionally includes at least either an optical disc apparatus or a hard disk.

The communication section 13 includes, for example, an integrated circuit, a connector, and an antenna. The integrated circuit forms a wired local area network (LAN) or a wireless LAN. The communication section 13 has a function of communicating with another apparatus through a network. Under the control of the processor 11, the communication section 13 receives information from another apparatus, inputs the received information to the processor 11 and the memory 12, and transmits information to another apparatus.

The input/output section 14 includes a circuit for acquiring information inputted from hardware detecting a user operation, a display control circuit for outputting a video display signal to a display, a circuit for controlling the external storage apparatus such as an optical disc drive, and a circuit for outputting, for example, audio. The input/output section 14 acquires an input signal from an input device, such as a keyboard and a controller, converts the acquired input signal to obtain information, and inputs the obtained information to the processor 11 and the memory 12.

The flash storage 15 includes a flash memory element and a controller for the flash memory element.

Figure 2:
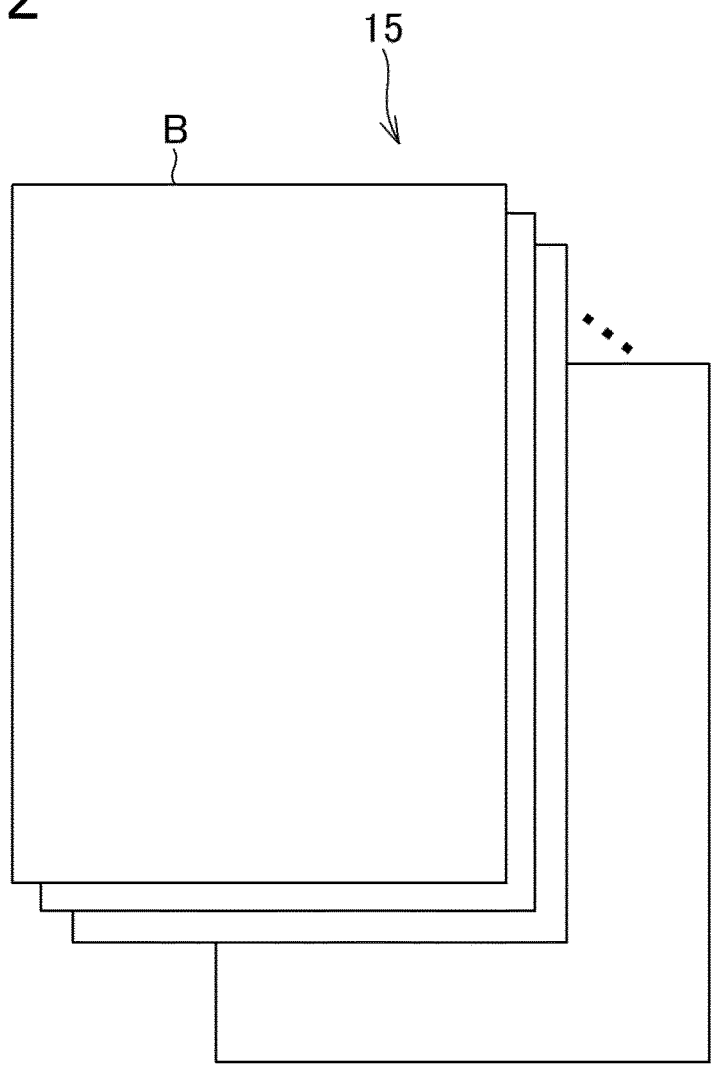
FIG. 2 is a diagram illustrating a configuration of a storage area of a flash storage.

FIG. 2 is a diagram illustrating a configuration of a storage area of the flash storage 15. The storage area of the flash storage 15 is divided into a plurality of blocks B. The blocks B each have a storage area, for example, of several hundred megabytes to several gigabytes. The processor 11 which executes an operating system controls the flash storage 15 to sequentially write datasets to the individual blocks B. Further, a dataset recorded in a block B cannot be simply overwritten with ease. After all data stored in a block B including the dataset is deleted, a new dataset can be stored in the block B. It should be noted that the blocks B included in the flash storage 15 each include a plurality of pages, and that, in terms of hardware, the datasets are written into the flash memory element on an individual page basis. Therefore, when viewed from the programs running on the operating system, the datasets are divided into one or more write units depending on a page size, and the resulting one or more write units are sequentially written into the storage areas of the blocks B.

In the present embodiment, one or more blocks B are assigned to logical partitions L (see FIG. 6), so that the information processing apparatus sequentially writes the datasets into the individual logical partitions L and deletes data from the individual blocks B included in the logical partitions L. Writing a dataset into a logical partition L means writing a dataset into one of the blocks B included in the logical partition L.

Figure 3:
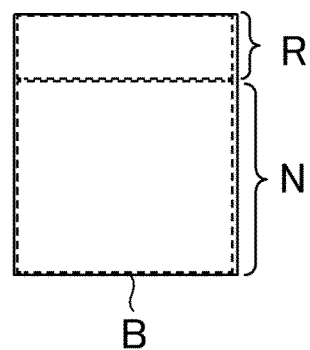
FIG. 3 is a diagram illustrating a normal area and a reserved area that are provided in a block.

The storage area of each block B includes an area where no dataset is to be stored. FIG. 3 is a schematic diagram illustrating a normal area N and a reserved area R that are provided in a block B. The normal area N is an area where a dataset can be stored. The reserved area R is an area where the storage of a dataset is prohibited. Here, it is assumed that the default sizes of the normal area N and reserved area R are predetermined. Processing and advantages of the reserved area R will be described later.

Figure 4:
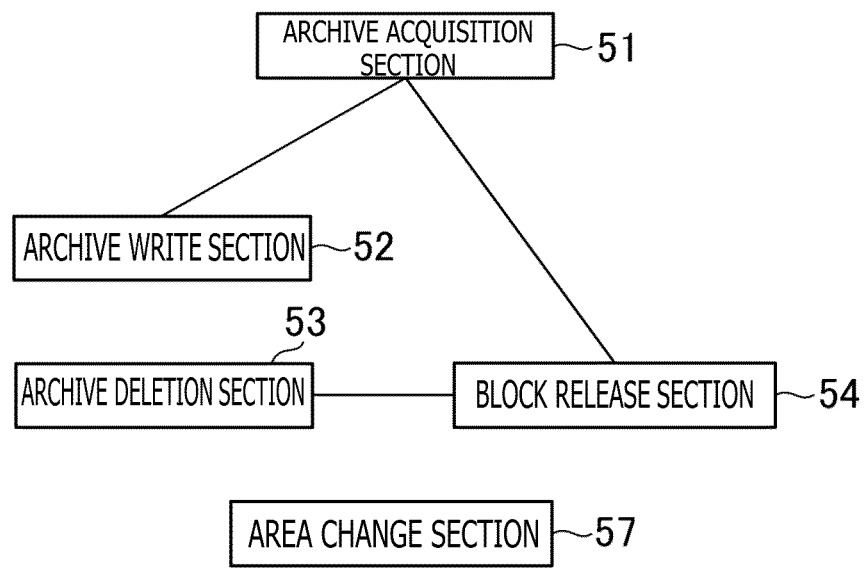
FIG. 4 is a block diagram illustrating functions implemented by the information processing apparatus.

Functions and processing implemented by the information processing apparatus will now be described. FIG. 4 is a block diagram illustrating the functions implemented by the information processing apparatus. The information processing apparatus functionally includes an archive acquisition section 51, an archive write section 52, an archive deletion section 53, a block release section 54, and an area change section 57. The functions of these sections are implemented mainly when the processor 11 executes the programs stored in the memory 12 to control the communication section 13, the input/output section 14, and the flash storage 15.

The archive acquisition section 51 receives an archive acquisition instruction from a user, and acquires, as a dataset, a new archive designated by the archive acquisition instruction. Archives belong to one of a plurality of predefined categories. The archives are classified, for example, into three categories, namely, "package," "modification package," and "additional content." The package includes a program of an application and data for video and other content outputted from the program. The modification package is an archive for upgrading the package. The additional content (AC) includes data for additional content available for the program of the application.

When acquiring a new archive, the archive acquisition section 51 may receive a designated archive from a distribution server through a network or may read a designated archive recorded on an optical disc or other external storage medium. Processing performed by the archive acquisition section 51 will be described in detail later.

The archive write section 52 stores a new archive acquired by the archive acquisition section 51 in the normal area N of one or more blocks B.

In accordance with a deletion instruction from the user, the archive deletion section 53 sets, as an unnecessary dataset, an archive that is to be stored in the flash storage 15 and user-specified to be deleted. In this instance, the archive deletion section 53 sets the archive as an unnecessary dataset by causing the flash storage 15 to store a deletion flag for the archive, which is user-specified to be deleted.

The block release section 54 performs generally-called garbage collection to release an area of the flash storage 15 that is made unnecessary by archive deletion and does not permit the writing of data, and obtain a writable area where no data is written. In the garbage collection, the block release section 54 transfers (or more specifically, copies) non-unnecessary datasets from the normal area N of a block B including unnecessary datasets to the normal area N of another block B, and deletes all datasets included in the normal area N of the copy source block B. The transfer source block B stores a logically deleted archive occupying the storage area of the block B, that is, an archive designated as a deleted archive by the deletion flag. The garbage collection will be described in detail later.

Here, the archive acquisition section 51 acquires a new dataset even when a writable area in the normal areas N of a plurality of blocks B is larger than a new archive and the new archive is smaller in size than the writable area in the normal areas N of the plurality of blocks B in a case where unnecessary archives included in the plurality of blocks B are deleted. In this instance, all the archives cannot be stored only in a block B that has an unoccupied area at the beginning of new archive acquisition. Therefore, the block release section 54 obtains a writable area by releasing the storage area of a block B including an unnecessary dataset. Further, in parallel with such a release, the archive write section 52 stores the acquired new archive in the normal area N of the block B. In such an instance, the archive write section 52 stores at least a part of the new archive in the normal area N of the released block B.

Based on a user operation or on changes in the amount of dataset stored in a plurality of blocks B, the area change section 57 changes the reserved area R included in the plurality of blocks B to the normal area N.

Figure 5:
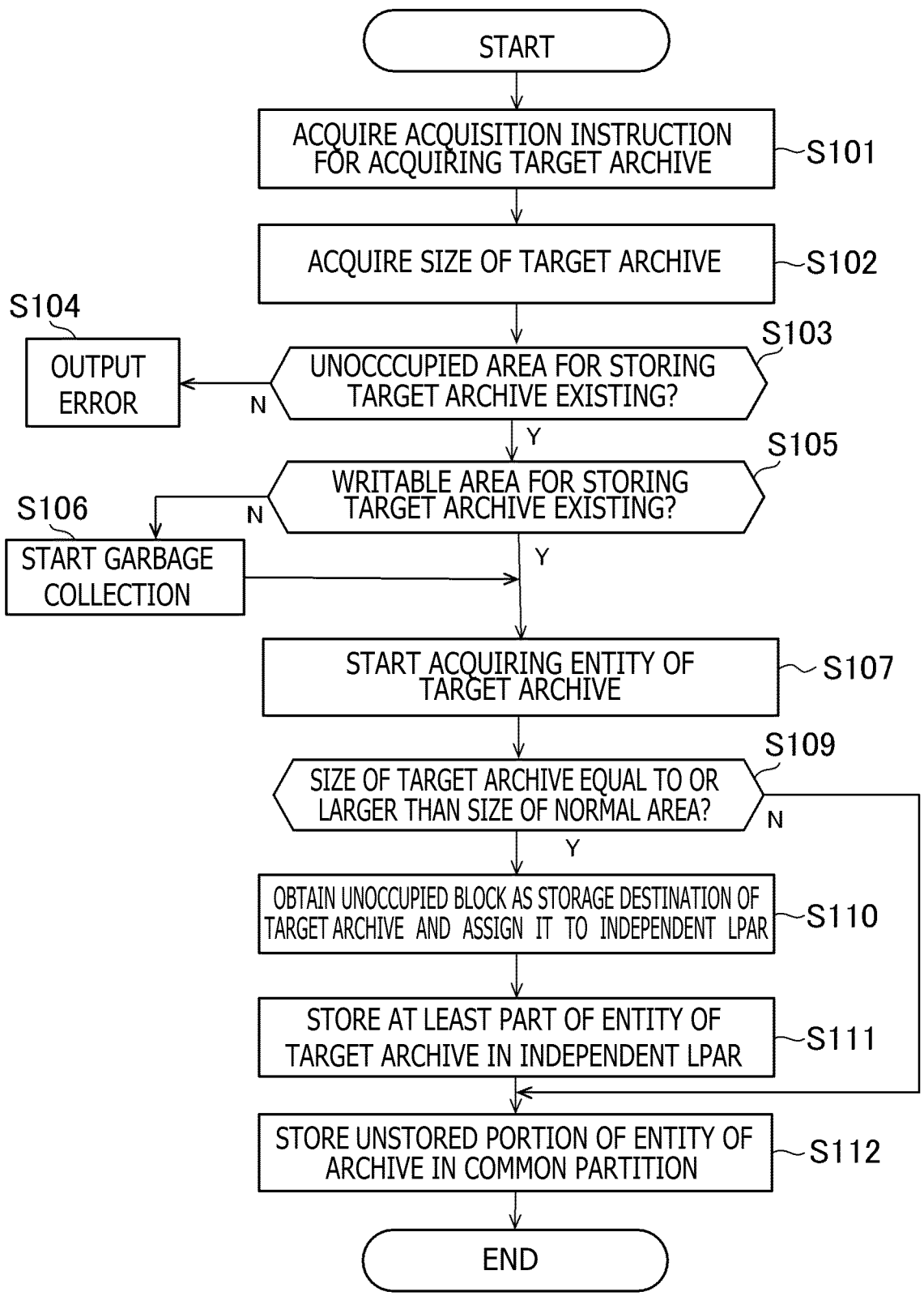
FIG. 5 is a flowchart illustrating an example of processing that is performed by the information processing apparatus to acquire an archive from the outside and store it in a flash memory.

A process of acquiring an archive and storing it in the flash storage 15 will now be described in more detail. FIG. 5 is a flowchart illustrating an example of processing that is performed by the information processing apparatus to acquire an archive from the outside and store the acquired archive in the flash storage 15.

First of all, the archive acquisition section 51 receives, from the user, an acquisition instruction for acquiring a target archive, for example, through the input/output section 14 (step S101). The acquisition instruction is information specifying the target archive which is to be newly acquired by the information processing apparatus and stored in the flash storage 15, among a plurality of archives existing in a server, for example. The acquisition instruction may be information specifying the target archive that is one or more archives to be stored on an optical disc or other external storage medium, newly acquired by the information processing apparatus, and stored in the flash storage 15. Further, the acquisition instruction may specify a plurality of target archives.

Upon receiving the acquisition instruction, the archive acquisition section 51 acquires the size of the target archive (step S102). The size of an archive indicates the size of an occupied area in a case where the archive is stored in the flash storage 15. Further, the archive acquisition section 51 may acquire the attributes of another archive (e.g., the category of an archive).

Upon acquiring the size of the target archive, the archive acquisition section 51 determines whether the flash storage 15 has an unoccupied area where the target archive can be stored (step S103). If no such unoccupied area exists in the flash storage 15 ("N" at step S103), the information processing apparatus outputs an error and terminates the processing (step S104). Here, it is assumed that the unoccupied area includes a writable area in the flash storage 15 as well as an area occupied by unnecessary archives and files that are logically deleted but physically not deleted.

Meanwhile, if an unoccupied area for storing the target archive exists in the flash storage 15 ("Y" at step S103), the archive acquisition section 51 determines whether the flash storage 15 has a writable area where the target archive can be stored (step S105). If no such writable area exists in the flash storage 15 ("N" at step S105), the information processing apparatus causes the block release section 54 to start a garbage collection process (step S106), and proceeds to step S107. Meanwhile, if the writable area exists ("Y" at step S105), the information processing apparatus skips step S106.

In step S107, the archive acquisition section 51 starts acquiring the entity of the target archive (step S107). In this instance, the archive acquisition section 51 may receive the entity of the target archive through the communication section 13 when the target archive exists on a server, or may read the entity of the target archive through the input/output section 14 when the target archive exists on an external storage medium.

When the reading of the entity of the target archive starts, the archive write section 52 determines whether or not the size of the target archive is equal to or larger than the size of the normal area N (or more accurately, the overall size of the normal area N included in a block B) (step S109). If the size of the target archive is equal to or larger than the size of the normal area N ("Y" at step S109), the archive write section 52 obtains an unoccupied block B as a target archive storage destination, and assigns the obtained unoccupied block B to an independent logical partition L (LPAR) (step S110). Further, the archive write section 52 stores at least a part of the entity of the target archive in the independent logical partition L (step S111). As a result, at least a part of the target archive is stored in a block B that does not store the other archives. Meanwhile, if the size of the target archive is smaller than the size of the normal area N ("N" at step S109), the information processing apparatus skips steps S110 and S111.

In step S111, the archive write section 52 may add, to the normal area N, the storage area of the reserved area R included in a block B assigned to the independent logical partition L, and store at least a part of the entity of the target archive in the normal area N to which the storage area is added. This suppresses a decrease in storage capacity due to the reserved area R.

When a part of the entity of the target archive is stored in the independent logical partition L, the archive write section 52 stores an unstored part of the entity of the target archive in the normal area N of a block B included in a common partition (step S112). If no unstored part of the entity of the target archive exists, the archive write section 52 does not store the entity of the target archive in the common partition.

By performing the above processing steps, the archive write section 52 executes the following three processes in a case where the target archive is larger in size than the blocks B. In a first process, the archive write section 52 divides the target archive into a plurality of parts. In a second process, the archive write section 52 stores at least a part of the plurality of parts in one or more blocks B that do not store the other archives. In a third process, the archive write section 52 stores a part of the plurality of parts not stored in the one or more blocks B in the blocks B in the common partition that stores the other archives. The size of an archive to be stored in one or more blocks B that do not store the other archives is equal to or larger than the size of the normal area N. Further, the size of an archive to be stored in a block B of the common partition is smaller than the size of the block B.

The common partition is a logical partition L to which one or more blocks B are assigned. The common partition stores data of a plurality of archives without regard to the category of an application. Each of the blocks B included in the common partition also stores the data of the plurality of archives. Incidentally, if no writable area is left in the common partition, the archive write section 52 assigns a new block B to the common partition for area expansion purposes, and thus makes it possible to store the archives.

Figure 6:
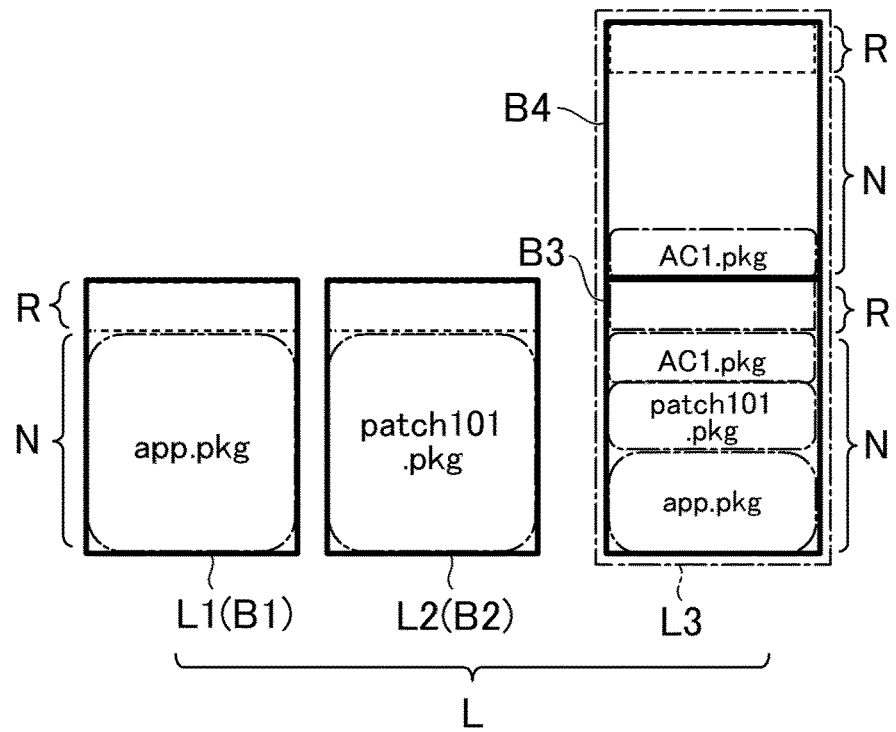
FIG. 6 is a diagram exemplifying archives stored in logical partitions.

FIG. 6 is a diagram exemplifying archives stored in the logical partitions L. In the example of FIG. 6, archives app.pkg, patch101.pkg, and AC1.pkg are sequentially acquired and stored in the flash storage 15. Logical partitions L1 and L2 include blocks B1 and B2, respectively. Logical partition L3 is a common partition to which blocks B3 and B4 are assigned. Further, the package (app.pkg) and the modification package (patch101.pkg) are partly stored in independent logical partitions L1 and L2, respectively. Furthermore, logical partition L3 stores AC1.pkg and portions of the archives app.pkg and patch101.pkg that could not be stored in logical partitions L1 and L2.

In the example of FIG. 6, blocks B1 to B4 each include the reserved area R, and archives are stored in the normal area N. In logical partition L3 to which a plurality of blocks B3 and B4 are assigned, a part of the archive AC1.pkg is stored. When no unoccupied area is left in the normal area N of block B3, the remaining part of the archive AC1.pkg is stored in the normal area N of block B4.

Archive deletion by the archive deletion section 53 will now be described. The archive deletion section 53 receives, from the user, an instruction (deletion instruction) for deleting a specific archive to be stored in the flash storage 15, for example, through the input/output section 14, sets a deletion flag for the specific archive in a block B where the specific archive is to be stored, and thus makes the specific archive unavailable. The reason why the entity of the specific archive is not deleted from the flash storage 15 is that erasure needs to be performed on the basis of an individual block B, and that it is impossible to erase only the entity of the specific archive. Incidentally, if the block B storing the specific archive does not include other archives left undeleted, the archive deletion section 53 erases the block B to make it unoccupied.

Figure 7:
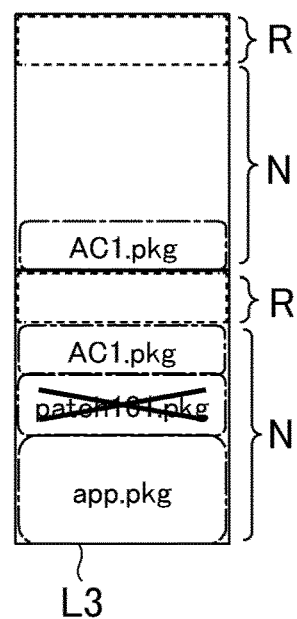
FIG. 7 is a diagram illustrating the deletion of an archive.

FIG. 7 is a diagram illustrating the deletion of an archive. The example of FIG. 7 depicts a case where the modification package patch101.pkg depicted in FIG. 6 is to be deleted. In this case, logical partition L2 storing only the entity of the modification package patch101.pkg and block B2 included in logical partition L2 are both deleted, and the entity of the modification package patch101.pkg to be stored in logical partition L3 is made unavailable.

Figure 8:
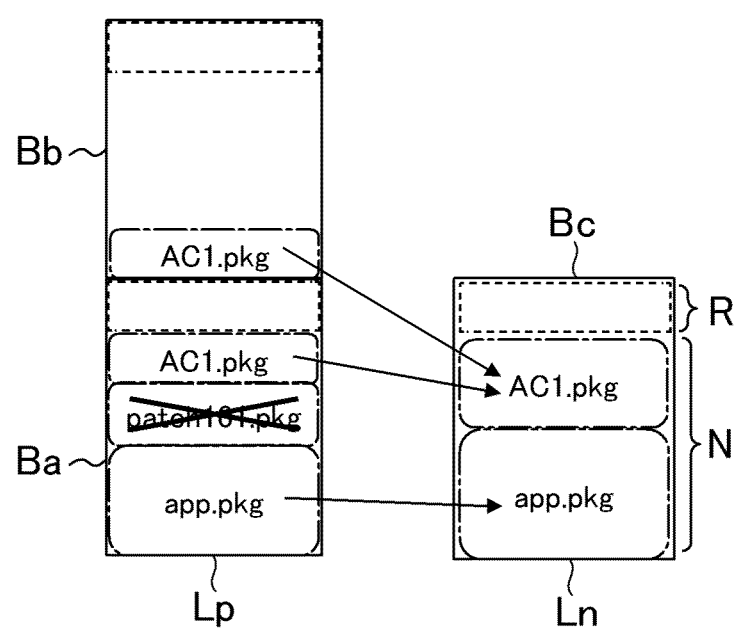
FIG. 8 is a diagram illustrating a method of garbage collection.

Garbage collection by the block release section 54 will now be described. FIG. 8 is a diagram illustrating a method of garbage collection. In the example of FIG. 8, an original logical partition Lp includes two blocks Ba and Bb. A logical partition Ln obtained upon garbage collection includes one block Bc, and stores archives that are stored in the logical partition Lp without being deleted. In the present embodiment, the garbage collection is a process of allowing the block release section 54 to copy archives stored in a plurality of blocks B (blocks Ba and Bb in FIG. 8) to the normal area N of a smaller number of blocks B (block Bc in FIG. 8) and thus release the copy source blocks B (blocks Ba and Bb in FIG. 8). This makes it possible to assign the released blocks B to another logical partition L and thus reduce an unavailable area and enlarge an actual writable area.

Figure 9:
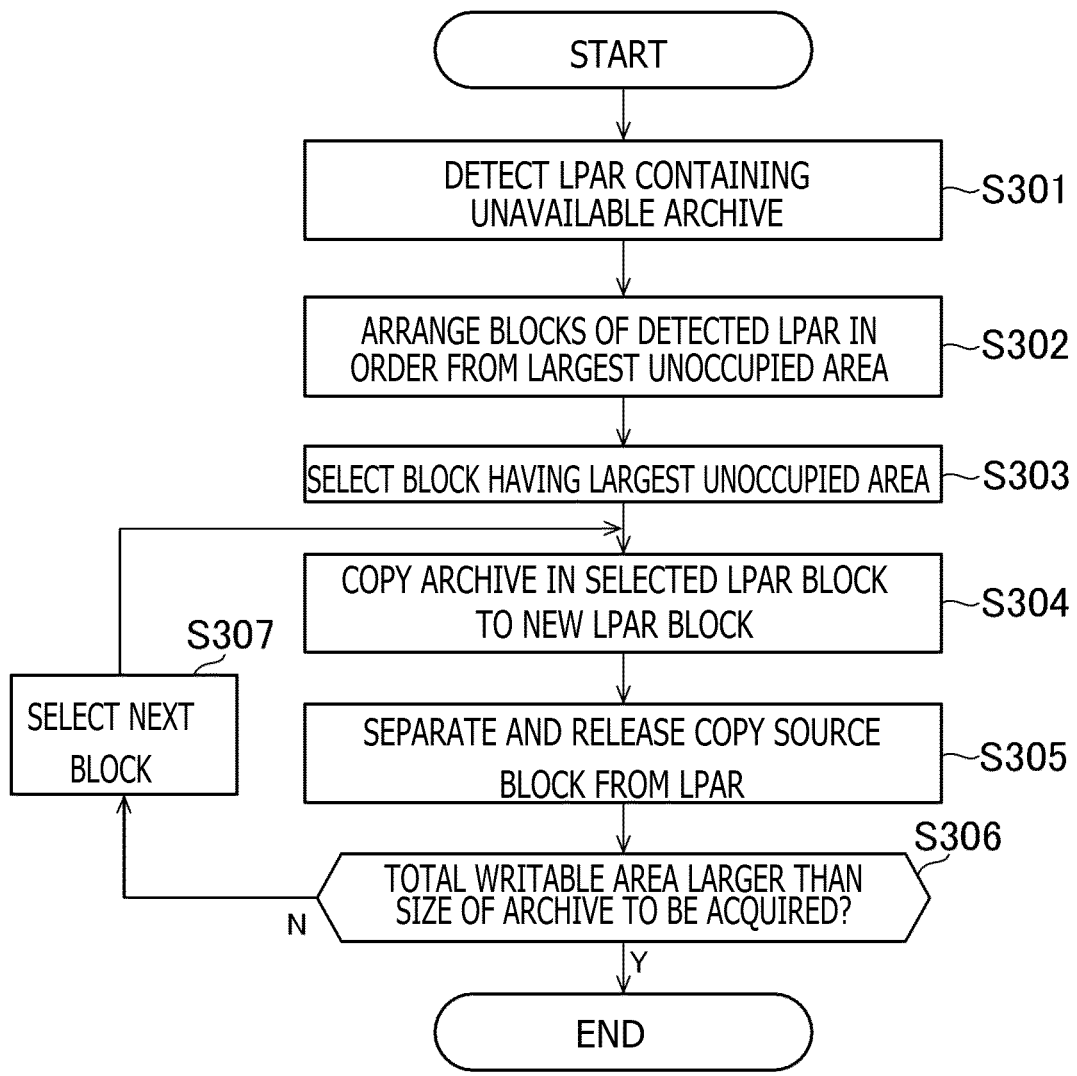
FIG. 9 is a flowchart illustrating an example of a garbage collection process.

FIG. 9 is a flowchart illustrating an example of the garbage collection process. First of all, the block release section 54 detects a logical partition L containing an unavailable archive (step S301).

The block release section 54 arranges blocks B of the detected logical partition L in order from the largest unoccupied area to the smallest (step S302), and selects a block B having the largest unoccupied area (step S303). The block release section 54 copies an archive in the selected block B in the logical partition L to a new block B in the logical partition L (step S304), and separates and releases the copy source block B from the logical partition L (step S305). In a case where the total writable area is larger than the size of an archive specified by the acquisition instruction and archive acquisition is started ("Y" at step S306), the block release section 54 terminates the garbage collection process. Meanwhile, in any other case ("N" at step S306), the block release section 54 selects the next block B (step S307) and repeats steps S304 and beyond.

Here, the following description deals with a case where there exists no writable area for storing an archive (dataset) acquired by the archive acquisition section 51 if garbage collection is not performed as described above. In this case, a process of releasing a block B by the block release section 54 and a process of storing an archive (dataset) in the released block B by the archive write section 52 are performed in parallel with each other. A transfer rate of data in the flash storage 15 is determined by the flash storage 15. A minimum transfer rate Rt for a write operation during the above parallel processes is not determined merely by a copy rate Rc for the garbage collection in the flash storage 15. A relation between the copy rate Rc and the minimum transfer rate Rt for a write operation is indicated in the following equation.

$$\frac{(Sb-Sd) \times \frac{Sb}{Sd}}{Rc-Rt} < \frac{Sb}{Rt} \qquad \text{[Math. 1]}$$

In the above equation, Sb is the size of the normal area N in a block B, and Sd is the size of a deleted dataset. Under the assumption of the worst case, Sd is set to a page size (e.g., 4.5 MiB) representing the minimum unit of dataset storage.

FIG. 10 is a diagram illustrating a relation between the minimum transfer rate Rt and the copy rate Rc required for garbage collection. Exemplary values calculated from the above equation are depicted in FIG. 10. In a case where the minimum transfer rate Rt is 25 MiB (corresponding to the transfer rate of Blu-ray), the copy rate Rc required for garbage collection is 250 MiB/sec when the ratio of the size of the reserved area R to the size of a block B (reserve rate) is 10%. However, when the reserve rate is 20%, the required copy rate Rc is decreased to 125 MiB/sec. That is, increasing the ratio of the reserved area R makes it easy to obtain the minimum transfer rate Rt even when the copy rate Rc is low.

As is obvious from the above description, providing the reserved area R makes it possible to ensure the minimum transfer rate Rt of data for dataset acquisition even in a situation where garbage collection and dataset acquisition are performed in parallel with each other.

However, the reserved area R does not store data. Therefore, as viewed from the user, the total capacity of the flash storage 15 is reduced by the size of the reserved area R. For a user who does not care about the time required for acquiring a new dataset, it may be desirable that no reserved area R be provided. The subsequent description deals with a process that is performed by the area change section 57 in order to cope with this problem.

Figure 11:
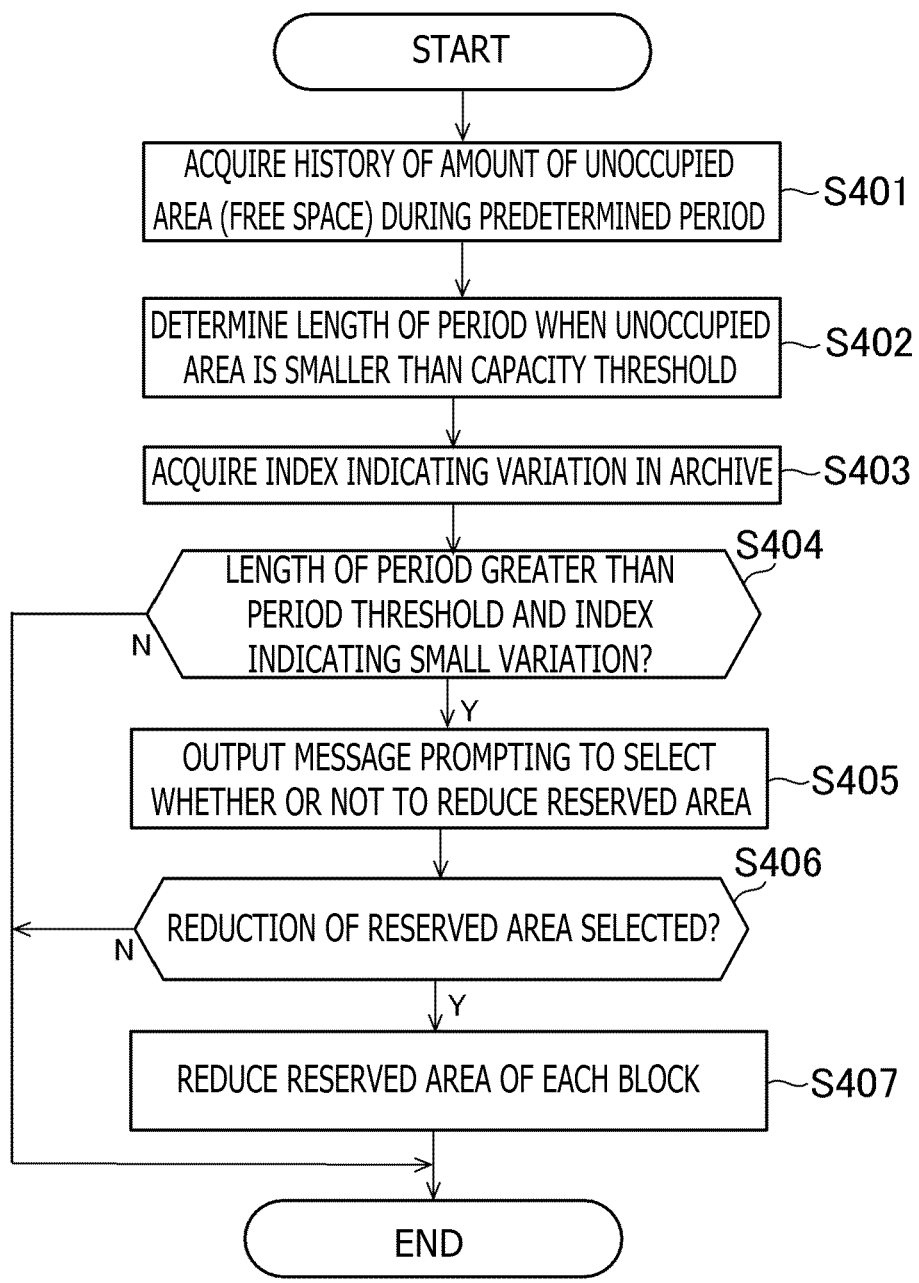
FIG. 11 is a flowchart illustrating an example of processing that is performed by an area change section.

FIG. 11 is a flowchart illustrating an example of the process that is performed by the area change section 57.

The process depicted in FIG. 11 may be performed at regular intervals (e.g., at intervals of a week). For the process performed by the area change section 57, it is assumed that the information processing apparatus monitors changes in the amount of unoccupied area (free space) and stores the history of free space in the memory 12.

First of all, the area change section 57 acquires the history of free space during a predetermined period (e.g., one week to one month) (step S401). Next, based on the acquired history, the area change section 57 determines the length of a period during which an unoccupied area is smaller than a capacity threshold (step S402). Further, the area change section 57 acquires an index indicating variation in an archive (step S403). The index indicating the variation in the archive may be the frequency of archive acquisition by the archive acquisition section 51 or the frequency of archive deletion.

After acquiring the length of the period and the index, the area change section 57 determines whether the length of the period is greater than a period threshold and the variation indicated by the acquired index is small (step S404). A small variation indicated by the acquired index may be such that the frequency of archive acquisition or deletion is lower than a frequency threshold.

If the length of the period is greater than the period threshold and the variation indicated by the acquired index is small (step S404), it is highly probable that the user will infrequently feel difficulty in archive acquisition. Therefore, the area change section 57 causes a display or other output device to output a message prompting the user to determine whether or not to reduce the reserved area R (step S405). Then, the area change section 57 acquires a user's response to the message. When the acquired user's response indicates the reduction of the reserved area R ("Y" at step S406), the area change section 57 reduces the reserved area R of each of a plurality of blocks B (step S407). The area change section 57 may perform garbage collection after the reduction of the reserved area R.

Incidentally, in a case where the user operates a setting screen to simply issue an instruction for reducing the reserved area R without allowing the area change section 57 to perform steps S401 to S405, the area change section 57 may proceed to perform step S407. Further, the area change section 57 may automatically optimize the reserved area R without performing steps s405 and S406. An alternative is to allow the area change section 57 to measure the communication speed of the information processing apparatus, and reduce the reserved area R if the measured communication speed is equal to or lower than a threshold.

Allowing the area change section 57 to perform the above process makes it possible to optimally obtain speed and capacity for dataset acquisition in accordance with a user's situation.

The invention claimed is:

1. A storage management apparatus comprising:
a flash memory that includes a plurality of blocks, the plurality of blocks each including a normal area and a reserved area, the normal area being configured to store one or more datasets, storage of datasets in the reserved area being prohibited, a ratio of a size of the reserved area to a size of the normal area being set to maintain a data transfer rate of the flash memory at a predetermined level; and
circuitry configured to
acquire a new dataset when a writable area included in a normal area of the plurality of blocks is larger than the new dataset, the writable area including unnecessary datasets,
when the new dataset is to be acquired, copy non-unnecessary datasets from the normal area of a specific block including the unnecessary datasets to the normal area of another block, and delete all datasets included in the normal area of the specific block, and
store the new dataset in the normal area of the specific block from which all the datasets are deleted.

2. The storage management apparatus according to claim 1, wherein, when the new dataset is larger in size than the normal area of the plurality of blocks, the circuitry adds, to the normal area, a reserved area included in a specific block among the plurality of blocks, the specific block being provided with no dataset, and stores at least a part of the new dataset in the normal area of the specific block.

3. The storage management apparatus according to claim 1, wherein the circuitry is further configured to:
based on a user operation, change a reserved area included in the plurality of blocks to a normal area.

4. The storage management apparatus according to claim 1, wherein the circuitry is further configured to:
based on changes in an amount of dataset stored in the plurality of blocks, change a reserved area included in the plurality of blocks to a normal area.

5. The storage management apparatus according to claim 1, wherein the unnecessary datasets are identified as unnecessary via a flag.

6. The storage management apparatus according to claim 1, wherein the data transfer rate is directly proportional to the ratio of the size of the reserved area to the size of the normal area.

7. The storage management apparatus according to claim 1, wherein the circuitry is further configured to
determine a frequency of data writing and data deletion in the flash memory, and
cause a display to display a screen indicating whether the ration of the size of the reserved area to the size of the normal area is to be changed.

8. The storage management apparatus according to claim 1, wherein the circuitry is further configured to
determine a frequency of data writing and data deletion in the flash memory, and adjust the ratio of the size of the reserved area to the size of the normal area based on the frequency of data writing and data deletion to maintain the data transfer rate at the predetermined level.

9. The storage management apparatus according to claim 1, wherein the circuitry is further configured to perform a garbage collection process to delete data from normal areas of one or more blocks.

10. The storage management apparatus according to claim 9, wherein the garbage collection process is performed after copying non-unnecessary datasets from the normal areas of the one or more blocks.

11. The storage management apparatus according to claim 9, wherein the garbage collection process is performed in parallel with storing the new dataset in the normal area of the specific block.

12. The storage management apparatus according to claim 9, wherein the circuitry is further configured to
sort the plurality of blocks from blocks with a highest amount of unoccupied area to blocks with a lowest amount of unoccupied area, and
perform the garbage collection process starting with the blocks having a highest amount of unoccupied area.

13. The storage management apparatus according to claim 12, wherein the circuitry is configured to stop the garbage collection process in a case that sufficient space has been made available in the normal areas of at least some of the plurality of blocks to store the new dataset.

14. The storage management apparatus according to claim 1, wherein the plurality of blocks are including in a common partition.

15. The storage management apparatus according to claim 14, wherein when the circuitry determines that the normal areas in the plurality of blocks in the common partition have insufficient unoccupied space to store the new data set, the circuitry is configured to store at least part of the new data set in a block that is not included in the common partition.

16. The storage management apparatus according to claim 15, wherein the circuitry is configured to include the block that is not part of the common partition in a separate partition separate from the common partition.

17. The storage management apparatus according to claim 16, wherein the separate partition includes only the block not included in the common partition.

18. The storage management apparatus according to claim 14, wherein when the circuitry determines that the normal areas in the plurality of blocks in the common partition have insufficient unoccupied space to store the new data set, the circuitry is configured to add a new block to the common partition and store at least part of the new dataset in a normal area of the new block.

19. A storage management method comprising:
acquiring a new dataset when a writable area included in a normal area in a plurality of blocks included in a flash memory is larger than the new dataset, the writable area including unnecessary datasets, each of the plurality of blocks including a normal area configured to store one or more datasets and a reserved area in which dataset storage is prohibited, a ratio of a size of the reserved area to a size of the normal area being set to maintain a data transfer rate of the flash memory at a predetermined level;
when the new dataset is to be acquired, copying non-unnecessary datasets from the normal area of a specific block including the unnecessary datasets to the normal area of another block, and deleting all datasets included in the normal area of the specific block; and
storing the new dataset in the normal area of the specific block from which all the datasets are deleted.

20. A non-transitory computer-readable medium storing computer-readable instructions that, when executed by a computer, cause the computer to perform a method, comprising:
acquiring a new dataset when a writable area included in a normal area in a plurality of blocks included in a flash memory is larger than the new dataset, the writable area including unnecessary datasets, each of the plurality of blocks including a normal area configured to store datasets and a reserved area in which dataset storage is prohibited, a ratio of a size of the reserved area to a size of the normal area being set to maintain a data transfer rate of the flash memory at a predetermined level;
when the new dataset is to be acquired, copying non-unnecessary datasets from the normal area of a specific block including the unnecessary datasets to the normal area of another block, and deleting all datasets included in the normal area of the specific block; and
storing the new dataset in the normal area of the specific block from which all the datasets are deleted.

* * * * *